United States Patent [19]

Scrivener et al.

[11] Patent Number: 5,652,411
[45] Date of Patent: Jul. 29, 1997

[54] TOP LOADING LOAD CELL MASS COMPARATOR

[75] Inventors: Thomas F. Scrivener, Smithsburg; Zhong Qian Mo, Baltimore, both of Md.

[73] Assignee: Frazier Precision Instrument Company, Inc., Hagerstown, Md.

[21] Appl. No.: 423,808

[22] Filed: Apr. 18, 1995

[51] Int. Cl.$^6$ ............................................. G01G 3/08
[52] U.S. Cl. ........................... 177/229; 177/255; 177/212
[58] Field of Search ................................. 177/229, 184, 177/189, 212, 201, 253, 255, 262

[56] References Cited

U.S. PATENT DOCUMENTS

| | | | |
|---|---|---|---|
| 3,993,150 | 11/1976 | Brosh et al. | 177/211 |
| 4,411,327 | 10/1983 | Lockery et al. | 177/211 |
| 4,488,611 | 12/1984 | Jacobson | 177/211 |
| 4,561,512 | 12/1985 | Tramposch | 177/211 |
| 4,606,421 | 8/1986 | Schroeder | 177/211 |
| 4,655,305 | 4/1987 | Jacobson | 177/211 |
| 5,195,599 | 3/1993 | Salini | 177/211 |

*Primary Examiner*—Michael L. Gellner
*Assistant Examiner*—Anh Mai
*Attorney, Agent, or Firm*—Brady, O'Boyle & Gates

[57] ABSTRACT

A top loading load cell mass comparator having a load cell and a cantilevered beam connected between the load cell and a weight supporting platform which is self-centering to compensate for off-center loading when moving or replacing weights on the platform. A preload compressive force is applied to the load cell to minimize hysteresis and creep error in the load cell during weight exchanges on the weight supporting platform.

15 Claims, 6 Drawing Sheets

TOP LOADING LOAD CELL MASS COMPARATOR

BACKGROUND OF THE INVENTION

A load cell mass comparator is disclosed in applicants' U.S. Pat. No. 4,523,653 wherein a load cell is employed in a comparator assembly wherein comparisons between a standard and applied weights are obtained by suspending the weights from the assembly. To minimize hysterisis and creep error in the load cell, variations of stress on the strain gages within the load cell are minimized by applying a preload, such as a tension on the load cell at all times, even during weight exchanges. The comparator assembly is also constructed and arranged to maintain an axial alignment between the load cell and the mass to be calibrated.

In applicants' continuing research and development in the field of load cell mass comparators, the concept of preloading the load cell to minimize hysterisis and creep error has now been extended to top loading cell mass comparators.

While top loading weighing apparatus has been proposed having load cells operatively connected to a weight supporting platform, as disclosed in U.S. Pat. Nos. 3,993,150 and 4,411,327, the concept of preloading the load cells has not been considered.

SUMMARY OF THE INVENTION

The top loading load cell mass comparator of the present invention comprises, essentially, a base having a load cell mounted thereon and a cantilevered beam connected between the load cell and a weight supporting platform. The load cell is preloaded by applying a compression force against the cantilevered beam by means of a set screw assembly operatively connected between the base and the cantilevered beam. The weight supporting platform is self-centering to compensate for off-center loading when moving or replacing weights on the platform, and a cushioning material is applied to the platform surface for absorbing sudden weight surges when applying or replacing weights.

DESCRIPTION OF THE PREFERRED EMBODIMENTS

Figure 1:
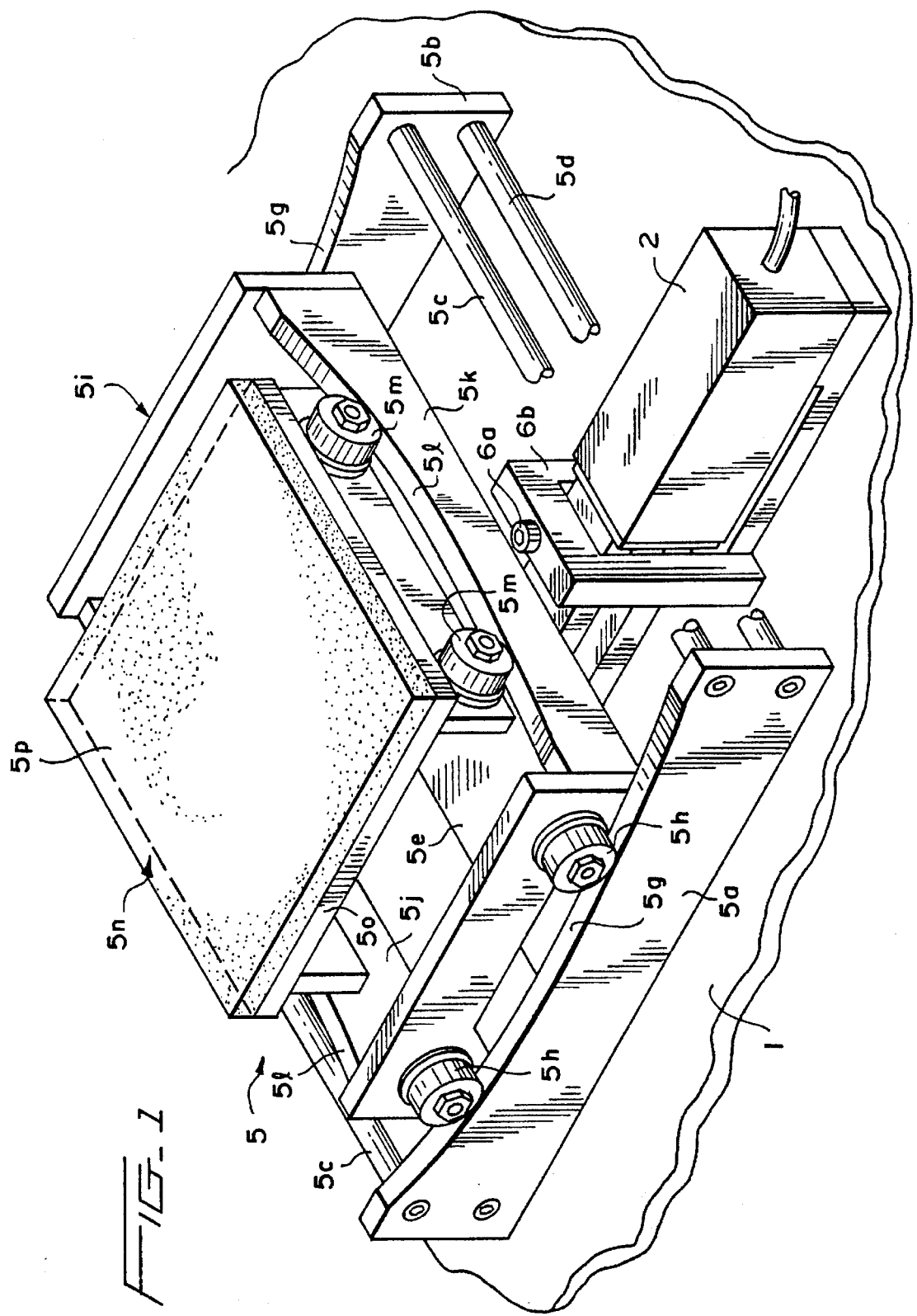
FIG. 1 is a fragmentary, perspective view showing an embodiment of the load cell comparator of the present invention wherein a track type self-centering weight supporting platform is employed.
Figure 2:
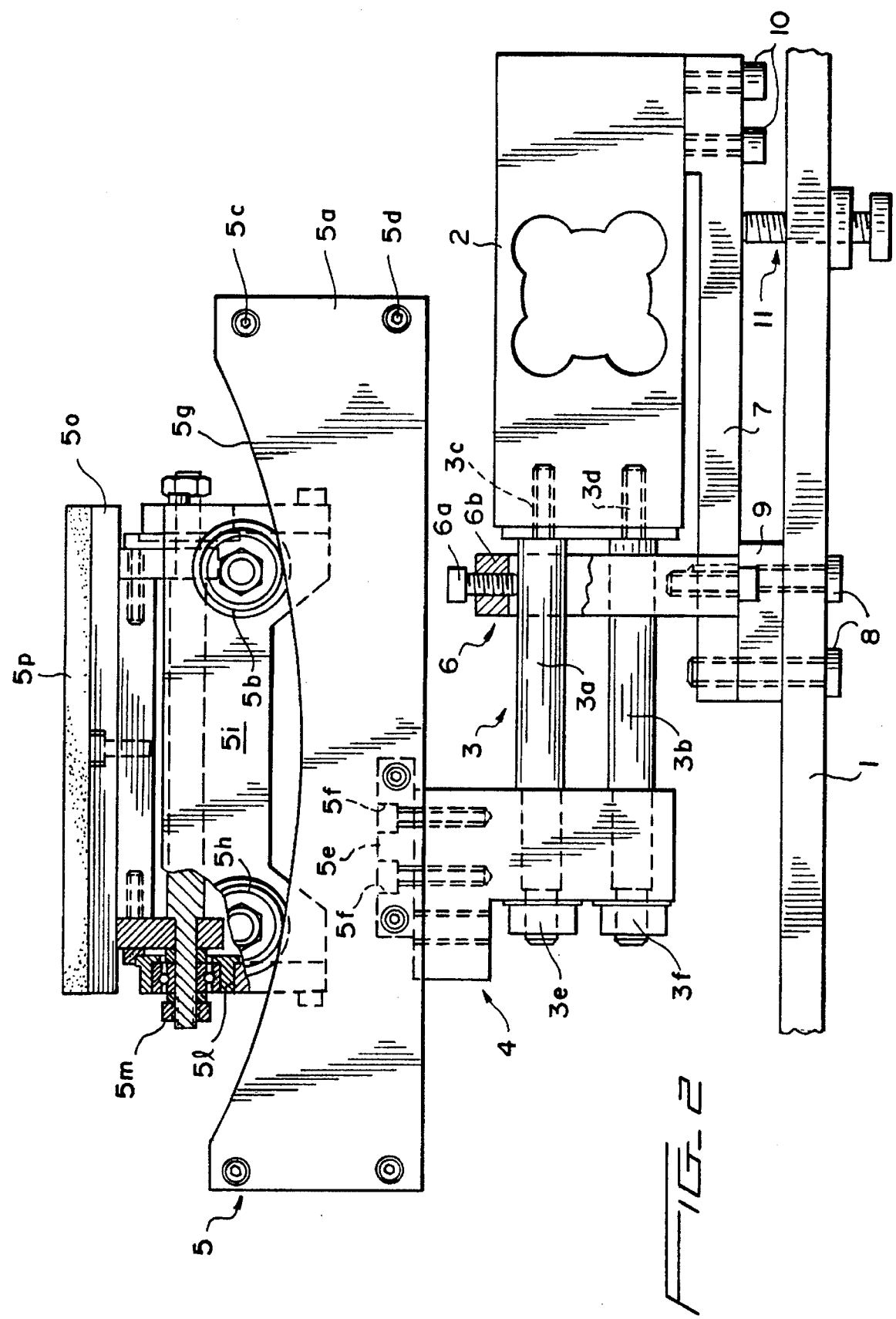
FIG. 2 is a fragmentary side elevational view of the load cell comparator shown in FIG. 1, illustrating the set screw assembly for preloading the load cell.

Referring to the drawings and more particularly to FIGS. 1 and 2, the top loading load cell mass comparator of the present invention comprises, a base I having a load cell 2 mounted thereon. The load cell 2 is of a conventional type, known by those skilled in the art, which basically includes a strain member to which strain gages are secured. The gages are wired to form a Wheatstone Bridge circuit across which a fixed excitation voltage is applied. Under no load conditions, there is no output voltage. As force is applied to the cell, minute deflections are imposed on the strain member, resulting in changes in the cross-section of the strain gages. The bridge thus becomes unbalanced and an output voltage is generated which is directly proportional to the applied load. The output voltage, appropriately amplified and measured, can be displayed or printed, or interfaced with programmers and computers in fully automated control systems.

A cantilevered beam 3 consisting of a pair of bars $3a$, $3b$, is secured at one end to the load cell 2 as at $3c$, $3d$, and to a bracket 4 at the opposite end, as at $3e$ and $3f$, a weight supporting platform 5, to be described more fully hereinafter, being secured to the bracket 4.

To minimize hysterisis and creep error in the load cell 2 during weight exchanges on the platform 5, the load cell 2 is preloaded with a compressive force provided by a set screw assembly 6 comprising a set screw $6a$ extending through the upper end surface of a yoke $6b$ having a pair of legs straddling the bars $3a$, $3b$ and engaging bars $3a$. The lower end of the yoke $6b$ is secured to a plate 7 spaced above the base 1 and secured at one end thereof to the base 1 by bolts 8 extending through spacer block 9. The opposite end of the plate 7 is secured to the load cell 2 by bolts 10. A second set screw assembly 11 extends through the base 1 and engages the bottom surface of plate 7 and adapted to provide a compression force against the load cell 2 in a direction opposite to the force applied by the set screw assembly 6, whereby the preload adjustment can be fine tuned.

The weight supporting platform 5 comprises a frame having a pair of walls $5a$, $5b$ held in spaced, parallel relationship by transversely extending rods $5c$, $5d$ rigidly connected at opposite ends to the walls $5a$ and $5b$. A transversely extending plate $5e$ is also fixedly connected to the walls $5a$, $5b$ in proximity to the lower edge portions thereof, the plate $5e$ being fixedly attached to the bracket 4 by bolts $5f$. The upper edges of the walls $5a$, $5b$ are formed with arcuate surfaces $5g$ for supporting rollers $5h$ on a first carriage $5i$ having transversely extending side walls $5j$, $5k$, provided with arcuate surfaces 51 on the top edges thereof for supporting rollers $5m$ on a second carriage $5n$. The second carriage $5n$ is provided with a weight supporting surface $5o$ having a cushion surface $5p$. By the construction and arrangement of the weight supporting platform 5, a self-centering platform is provided so that off-center loading of a weight on the cushioned supporting surface $5o$ is compensated, to thereby preclude extra stress on the load cell 2 which would appear as phantom weight error.

Figure 3:
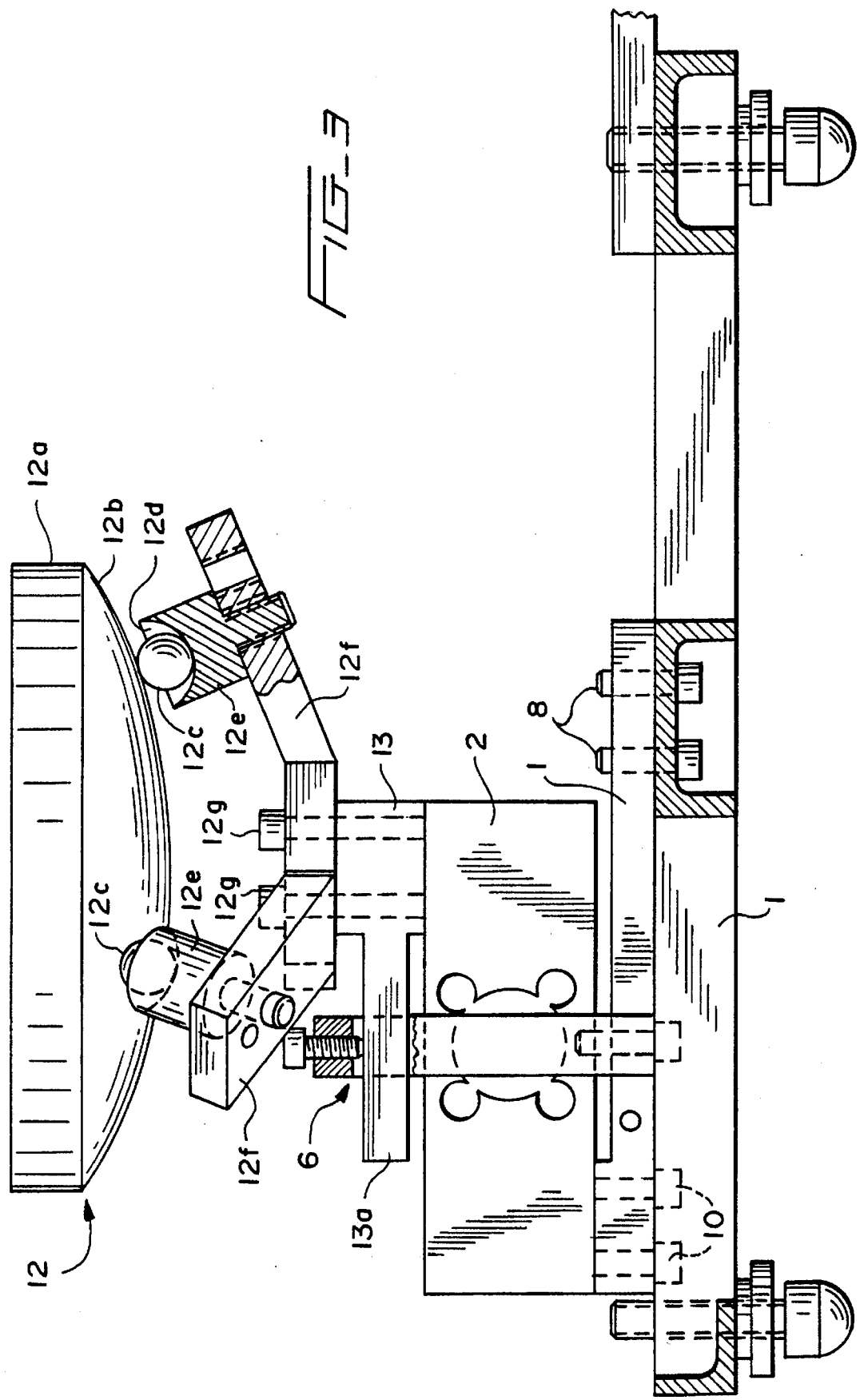
FIG. 3 is a side elevational view, partly in section, illustrating another embodiment of the load cell comparator of the present invention wherein a ball caster type self-centering weight supporting platform is employed and showing another set screw assembly arrangement for preloading the load cell.

FIG. 3 illustrates another embodiment of the load cell comparator of the present invention wherein a self-centering weight supporting platform 12 comprises a cushioned weight supporting surface 12a having a hemispherical lower surface 12b supported by a plurality of spherical members 12c contained in spherical recesses 12d provided in cup members 12e secured to the upper end portions of upwardly extending radial arms 12f. The lower ends of the arms 12f are secured to a block 13 by means of bolts 12g.

The block 13 is supported on the load cell 2 and is provided with a cantilevered beam 13a extending through the pre-load set screw assembly 6 secured at its lower end to the plate 7 having one end bolted to the base 1 as at 8 and at the other end to the load cell 2, as at 10.

Figure 4:
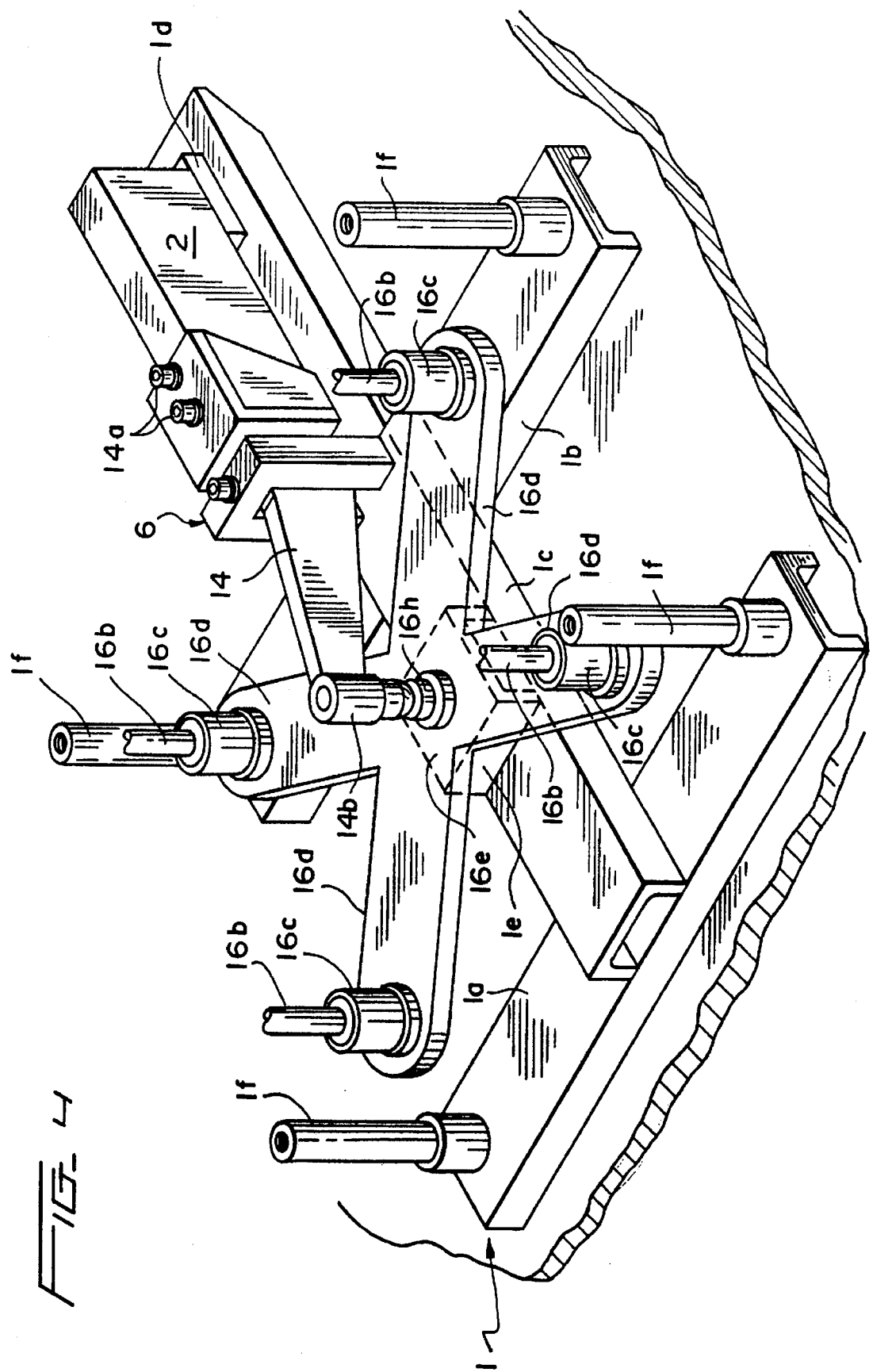
FIG. 4 is a fragmentary perspective view illustrating a base for supporting the load cell in yet another embodiment of the comparator.
Figure 5:
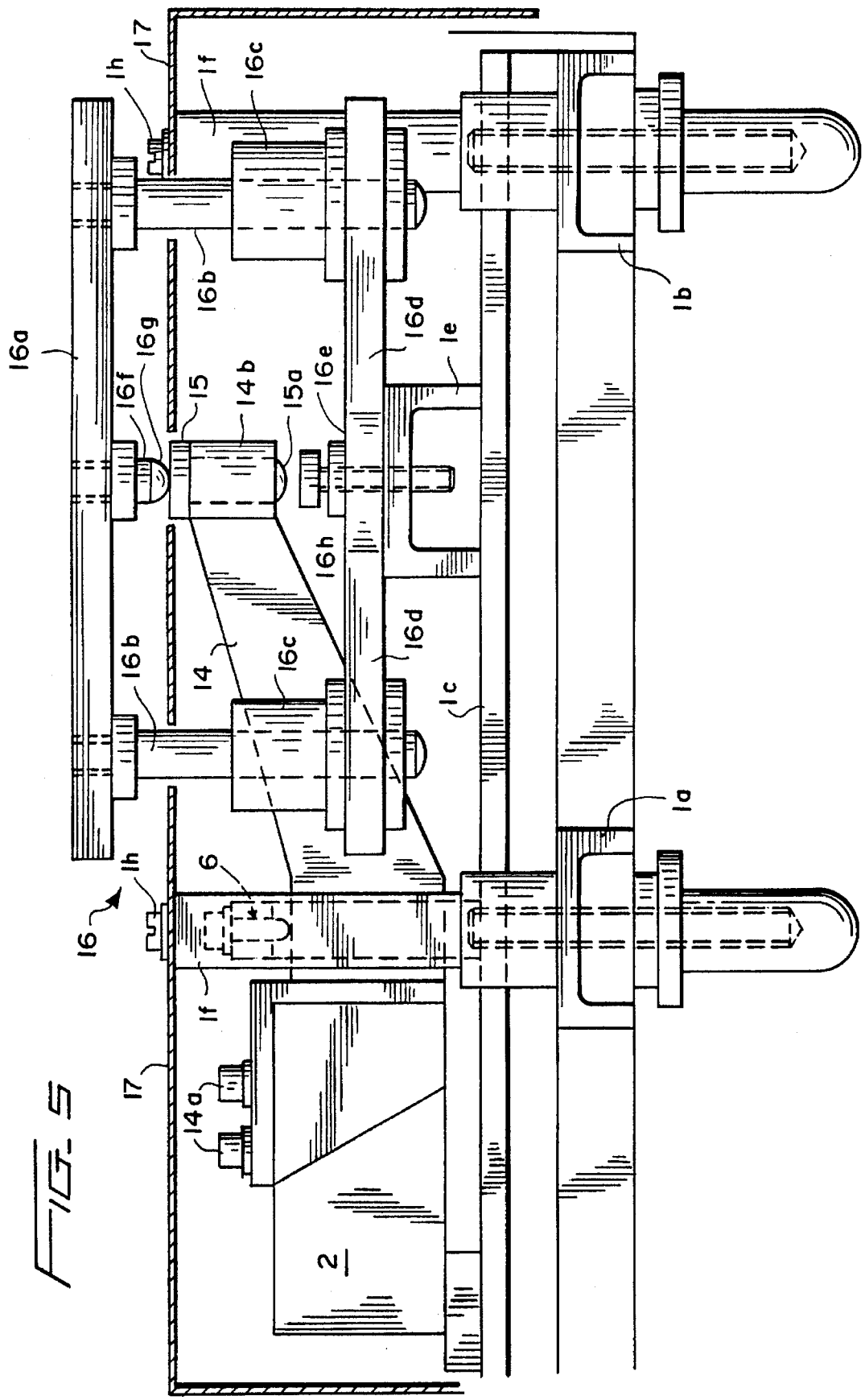
FIG. 5 is a side elevational view, partly in section, illustrating another embodiment of a self-centering weight supporting platform mounted on the base shown in FIG. 4.

FIGS. 4 and 5 illustrate still another embodiment of the load cell comparator of the present invention wherein the base 1 comprises a pair of spaced, parallel, longitudinally extending channel members 1a, 1b, and a transversely extending channel member 1c having a spacer block 1d mounted thereon, for supporting the load cell 2. One end of a cantilevered beam 14 is secured to the load cell as at 14a and the opposite end of the arm 14 is provided with a vertically oriented collar 14b receiving a bolt member 15 having a spherical lower end 15a.

The self-centering weight supporting platform 16 comprises a cushioned weight supporting table 16a having four depending leg members 16b slidably mounted in respective bearing members 16c mounted on the outer ends of radially outwardly extending arms 16d integrally connected at the center portion 16e to provide an auxiliary base which is supported by a channel member 1e secured to the transversely extending channel member 1c.

The center of the table 16a is provided with a depending leg 16f having a spherical foot portion 16g abutting the head of bolt member 15, and an adjustable stop member 16h is threadably mounted in the center portion 16e of arms 16d adapted to engage the spherical foot 15a to prevent excessive deflection of the cantilevered beam 14.

To complete the structure of the comparator shown in FIGS. 4 and 5, the pre-load set screw assembly 6 straddles the beam 14 and is secured to the channel 1c; and four upwardly extending columns 1f are supported on the channels 1a and 1b and are provided with threaded bores 1g for receiving screws 1h for the mounting of a suitable housing or cover 17.

Figure 6:
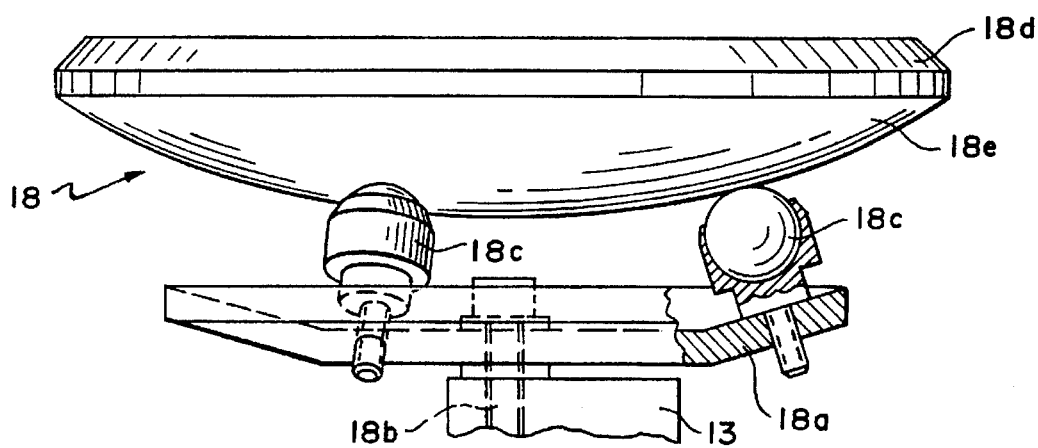
FIG. 6 is a side elevational view, partly in section, of a ball caster type self-centering weight supporting platform adapted to be substituted for the platform shown in FIG. 3.

FIG. 6 illustrates still another embodiment of a self-centering weight supporting platform 18 adapted for use on the comparator shown in FIG. 3, wherein a dish member 18a is bolted as at 18b to the block 13, and a plurality of circumferentially spaced ball casters 18c are mounted on the dish member 18a. The platform 18 comprises a cushioned weight supporting surface 18d having a hemispherical lower surface 18e supported by the casters 18c.

Figure 7:
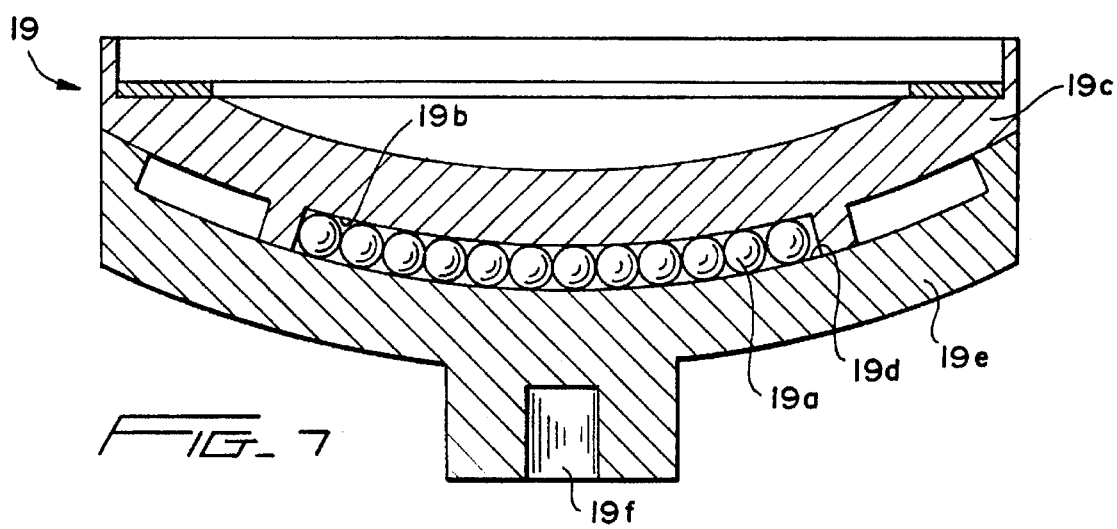
FIG. 7 is a sectional, side elevational view showing another embodiment of a self-centering weight supporting platform, to be mounted on the base shown in FIGS. 4 and 5, wherein anti-friction ball bearings are interposed a pair of hemispherical surfaces.

FIG. 7 illustrates yet another embodiment of a self-centering weight supporting platform 19 adapted for use on the comparator shown in FIGS. 4 and 5, wherein anti-friction ball bearings 19a are interposed a convex hemispherical bottom surface 19b on a cushioned weight supporting surface 19c, and a concave hemispherical upper surface 19d on a dish member 19e. A recess 19f is provided in the bottom of the dish member 19e for receiving the depending leg 16f shown in FIG. 5, whereby the self-centering weight supporting platform 19 engages the outer end of the cantilevered arm 14.

Figure 8:
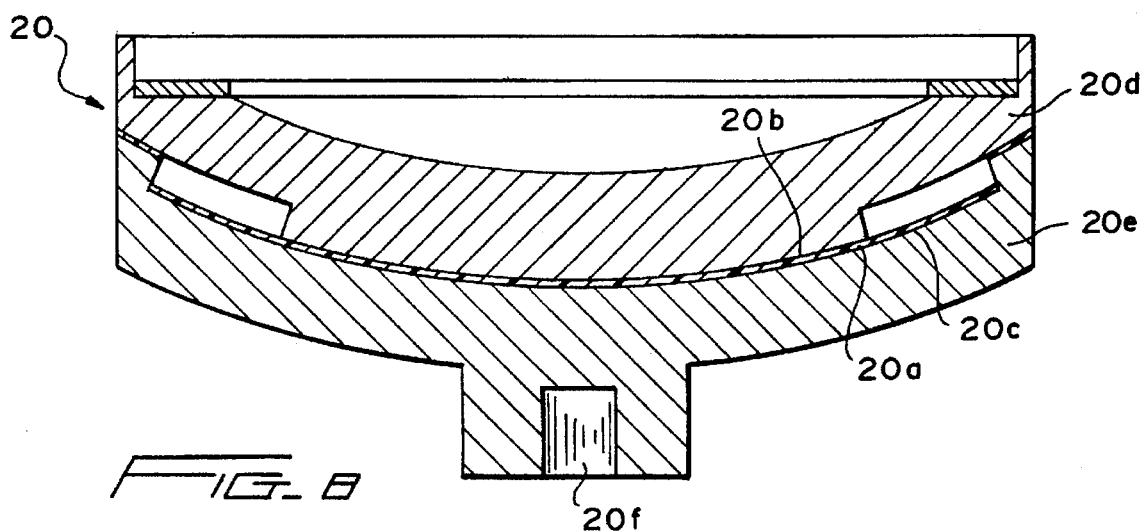
FIG. 8 is a sectional, side elevational view showing yet another embodiment of a self-centering weight supporting platform, similar to the platform shown in FIG. 7, wherein a plastic lubricant is interposed a pair of slidable hemispherical surfaces.

FIG. 8 illustrates yet still another embodiment of a self-centering weight supporting platform 20 similar to that of FIG. 7; however, having a plastic lubricant 20a interposed the hemispherical surfaces 20b and 20c on the cushioned weight supporting surface 20d and dish member 20e, respectively, the recess 20f adapted to receive the depending leg 16f.

From the above description, it will be appreciated by those skilled in the art that the construction and arrangement of the improved top loading load cell mass comparator of the present invention provides not only a self-centering weight supporting platform to compensate for off-center loading when moving or replacing weights on the platform, but also the preload compressive force applied to the load cell minimizes hysterisis and creep error in the load cell during weight exchanges on the weight supporting platform.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A top loading load cell mass comparator comprising a base, a load cell mounted on said base, a cantilevered beam connected at one end to said load cell, a weight supporting platform operatively connected to the other end of said beam, and means for applying a compressive preload on the load cell, to thereby minimize hysterisis and creep error in the load cell during weight exchanges on the weight supporting platform.

2. A top loading load cell mass comparator according to claim 1, wherein the cantilevered beam comprises a pair of bars.

3. A top loading load cell mass comparator according to claim 1, wherein the weight supporting platform is self-centering and comprises, a frame mounted on said base and having a pair of spaced, parallel walls, said walls having upper edges formed with arcuate surfaces, a first carriage having rollers supported on said arcuate surfaces, said first carriage having a pair of spaced, parallel side walls extending normal to said frame walls, said side walls having upper edges formed with arcuate surfaces, a second carriage having rollers supported on the arcuate surfaces on the side walls of said first carriage, and a weight supporting surface on said second carriage.

4. A top loading load cell mass comparator according to claim 3, wherein the weight supporting surface is provided with means for absorbing shock to said weight supporting surface.

5. A top loading cell mass comparator according to claim 4, wherein the means for absorbing shock to said weight supporting surface comprises, a shock absorbing surface mounted on said weight supporting surface.

6. A top loading load cell mass comparator according to claim 1, wherein the weight supporting platform comprises, a plurality of upwardly inclined radially extending arms, cup members having spherical recesses connected to the upper end portions of said arms, a spherical member contained in the recess of each cup member, and a weight supporting member having a hemispherical lower surface supported on said spherical members.

7. A top loading load cell mass comparator according to claim 1, wherein the weight supporting platform comprises, an auxiliary base mounted on said base, bearing members mounted on said auxiliary base, a table, a plurality of legs depending from said table and extending into said bearing members, a spherical foot portion connected to said table and engaging to the other end of said beam.

8. A top loading load cell mass comparator according to claim 7, wherein an adjustable stop member is threadably mounted in said auxiliary base underneath said other end of said beam to thereby prevent excessive deflection of said beam.

9. A top loading load cell mass comparator according to claim 1, wherein the load supporting platform comprises, a dish member, a plurality of circumferentially spaced ball casters mounted on said dish, and a weight supporting member having a hemispherical lower surface supported on said ball casters.

10. A top loading load cell mass comparator according to claim 1, wherein the load supporting platform comprises, a dish member having a concave hemispherical upper surface, a weight supporting member having a convex bottom surface, and a bearing interposed the concave and convex surfaces.

11. A top loading load cell mass comparator according to claim 10, wherein the bearing comprises, a plurality of anti-friction ball bearing.

12. A top loading load cell mass comparator according to claim 10, wherein the bearing comprises a plastic lubricant.

13. A top loading load cell mass comparator according to claim 1, wherein the means for applying a compressive preload on the load cell comprises, a first set screw assembly connected to said cantilevered beam.

14. A top loading load cell mass comparator according to claim 13, wherein the first set screw assembly comprises, a yoke having an upper end portion spaced above the cantilevered beam and a pair of depending legs straddling said beam, and a set screw extending through said upper end portion and engaging said beam.

15. A top loading load cell mass comparator according to claim 13, wherein a second set screw assembly is provided for applying a compressive preload force on the load cell in a direction opposite to the force applied by the first set screw assembly, whereby the preload adjustment can be fine tuned.

* * * * *